United States Patent [19]
Williams

[11] 3,844,315
[45] Oct. 29, 1974

[54] LAMINATED CONDUIT AND SYSTEM

[76] Inventor: James W. Williams, 3029 Country Club Dr., Costa Mesa, Calif. 92626

[22] Filed: Mar. 26, 1973

[21] Appl. No.: 344,625

[52] U.S. Cl. ............................... 138/140, 138/144
[51] Int. Cl. .......................... F16l 9/14, F16l 9/16
[58] Field of Search .................... 138/144, 140, 141

[56] References Cited
UNITED STATES PATENTS

| | | | |
|---|---|---|---|
| 2,047,778 | 7/1936 | Hayden | 138/144 |
| 2,089,492 | 8/1937 | Lambert | 138/144 |
| 2,131,343 | 9/1938 | Cordiano et al. | 138/144 |
| 2,181,035 | 11/1939 | White | 138/144 |
| 2,213,253 | 9/1940 | Novak | 138/144 |
| 2,226,523 | 12/1940 | Peck | 138/140 |
| 2,798,510 | 7/1957 | Martin et al. | 138/144 |
| 3,178,088 | 4/1965 | Herr | 138/140 |
| 3,424,204 | 1/1969 | Sato | 138/144 |

FOREIGN PATENTS OR APPLICATIONS

| | | | |
|---|---|---|---|
| 957,709 | 5/1964 | Great Britain | 138/140 |

*Primary Examiner*—James J. Gill
*Assistant Examiner*—Anthony V. Ciarlante
*Attorney, Agent, or Firm*—William W. Haefliger

[57] ABSTRACT

A laminated, stiff conduit comprises multiple layers including fire-proof paper one of which is corrugated, chip board, and metal foil layers on the inside and outside of the conduit.

4 Claims, 3 Drawing Figures

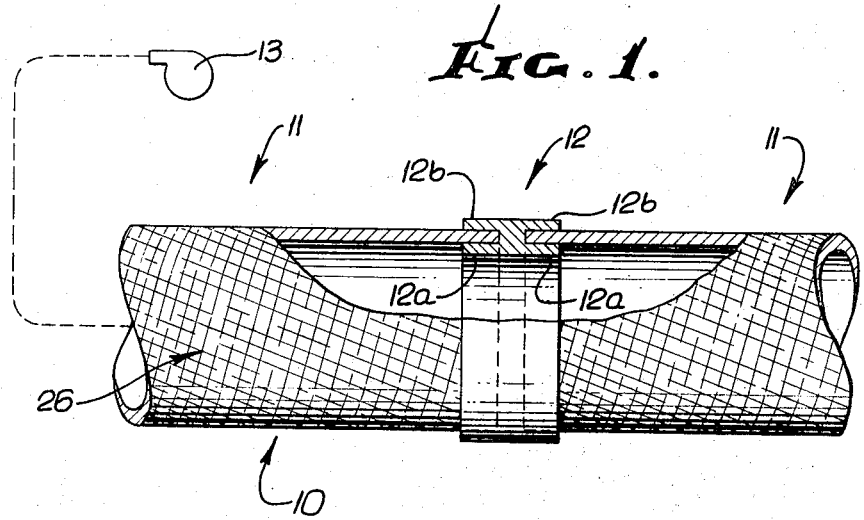
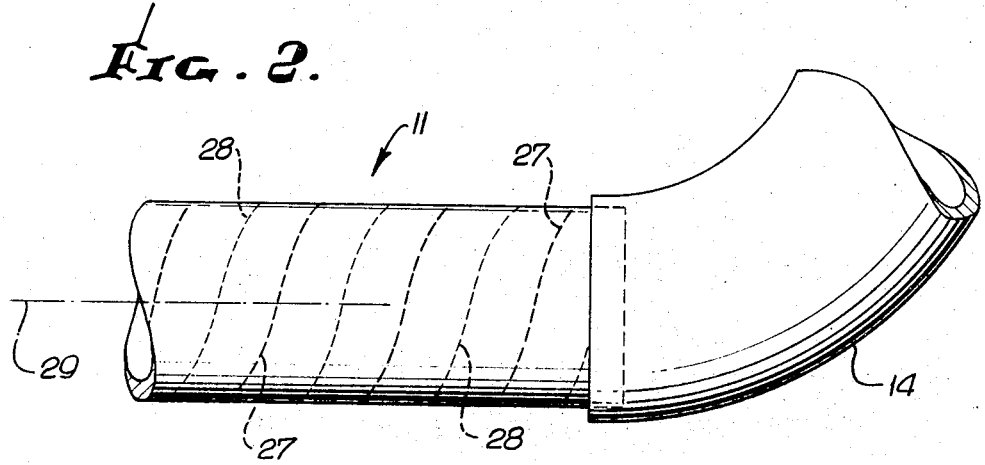
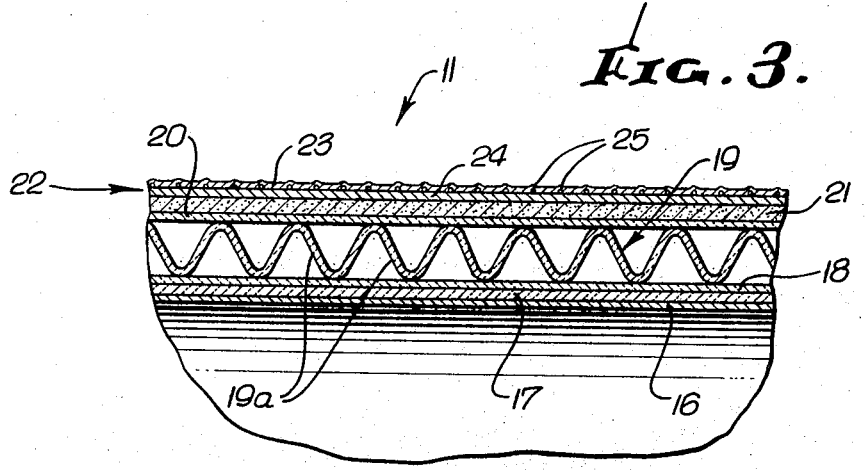

LAMINATED CONDUIT AND SYSTEM

BACKGROUND OF THE INVENTION

This invention relates generally to the construction of conduits, and more specifically concerns the provision of a rigid, non-metallic, fire-proof conduit of improved laminate construction for use in heating and air-conditioning applications.

Metallic ducts used in air-conditioning and heating applications are characterized by certain disadvantages. Among the latter are their tendency to conduct undesirable noise into rooms, such noise arising from blower operation and air flow past duct metallic surfaces and bends, the need for application of an outer layer of insulation, and relatively high cost.

SUMMARY OF THE INVENTION

It is a major object of the invention to provide a noise deadening, non-metallic, fire-proof conduit overcoming the above problems and characterized by a number of additional advantages. Among these are rigidity, high strength, heat insulation, lack of need for application of either an outer layer of insulation and/or an outer metallic sheath.

Basically, the conduit is of laminated construction comprising a first and innermost layer consisting of metallic foil; second and third layers consisting of fire-proof paper, a fourth layer of corrugated fire-proof paper; a fifth layer of fire-proof paper, the third and fifth layers adherent to the crests of the corrugations at opposite sides of the fourth layer; a sixth layer consisting of chip board for providing rigidity and strength; and a seventh layer including an outwardly facing metallic foil sheet. As will appear, the seventh layer may also include a layer of Kraft paper at the inner side of the foil sheet and glass fiber scrim sandwiched between the foil sheet and Kraft paper layer, for added strength. Further, the layers may extend in spirals to overlap joints of next adjacent layers, and metallic joints may interconnect conduits in end-to-end series relation, as will be seen.

These and other objects and advantages of the invention, as well as the details of an illustrative embodiment, will be more fully understood from the following description and drawings, in which:

DRAWING DESCRIPTION

FIG. 1 is a side elevation, partly broken away, to show a conduit system;

FIG. 2 is a side elevation showing another portion of the FIG. 1 system; and

FIG. 3 is an enlarged section showing conduit wall laminations.

DETAILED DESCRIPTIONS

A heating or air-conditioning conduit system 10 includes multiple conduits 11 typically interconnected as by annular metallic joints 12 having inner and outer sleeve sections 12a and 12b. The joints connect successive conduits in end-to-end series relation, the conduits typically having a length of between about 5 and 9 feet, and preferably about 7 feet. No inner or outer insulation is required, and system rigidity, simplicity and low cost are achieved despite the fact that the conduits themselves are essentially non-metallic. A blower 13 is representative of an air-conditioner or heating plant blower or fan. FIG. 2 shows a metallic elbow 14 connected with the end of one of the conduits 11 in the system 10.

Referring to FIG. 3, the conduit 11 is shown in enlarged section to have laminate tubular construction and to include:

a. a first and innermost layer 16 consisting of metallic foil, as for example aluminum foil, b. a second layer 17 consisting of fire-proof paper adherent to the first layer 16 at the outer side of the latter, c. a third layer 18 consisting of fire-proof paper adherent to layer 17 at the outer side of the latter, d. a fourth layer 19 consisting of fire-proof paper forming multiple corrugations 19a whose crests at the inner side of the fourth layer are adherent to the other side of the third layer, e. a fifth layer 20 consisting of fire-proof paper adherent to the crests of the corrugations 19a at the outer side of the fourth layer, f. a sixth layer 21 consisting of chip board adherent to the fifth layer at the outer side thereof, the thickness of the layer 21 substantially exceeding the thickness of each of the second, third and fifth layers, g. and, a seventh layer 22, including an outwardly facing metallic foil 23, operatively connected to the sixth layer at the outer side of the latter. As will be seen, the seventh layer also may advantageously include a layer 24 of flame resistant paper, as for example Kraft paper, at the inner side of the foil sheet 23, and glass fiber scrim or strands 25 may advantageously be sandwiched between the foil and layer 24 to bend additional strength.

The layers 17, 18, 19 and 20 preferably consist of asbestos paper, an example being known in the trade as No. 6, i.e., 6 pounds weight per 100 foot length, and consisting of about 82 percent asbestos and 18 percent Kraft paper for strength. Kraft paper layer 24 is a flame resistant, treated Kraft paper, as for example "FIRE-BAND" material, a product of Compact Corp. of Netcon, N.J. It may be pre-bonded to the foil 23, with the scrim therebetween (producing a net or mesh like striated appearance or effect on the foil as seen at 26 in FIG. 1), so as to be spiral wrappable on the layer 21 during fabrication. Layer 17 may likewise be pre-bonded to the inner foil sheet 16. All layers may be bonded together with a fire-proof water glass bond, as for example N-Brand silicate. Chip board layer 21 may be about 0.020 inches thick.

The layers as described may be formed from elongated strip s of material, as for example about 5½ inches wide, and spiral wrapped along the conduit length and about the axis 27 of the conduit, as for example is seen in FIG. 2. Thus, for example the spiral joint 27 (in broken lines) formed by layer 21 is shown as overlapped by layer 24, the spiral joint 28 (in broken lines) formed by the latter being underlapped by layer 21. The corrugated layer is also spiral wrapped, but in such manner that the corrugations extend axially of the conduit.

The resultant conduit has an unusually advantageous combination of qualities including: noise-proofness, rigidity, thermally insulative, strength, flame-proof, light weight, lack of need for an additional outer insulative layer as is required for metallic conduits in heating and air-conditioning, and lack of need for any outer metal pipe or sheath. Also, the fact that metal foil layers 16 and 23 are employed at the inner and outer faces of the conduit not only adds to the insulative effectiveness of the conduit, but also ensures that the asbestos layers are not directly exposed at the exterior, or interior of the conduit, to remove any deleterious effects of asbestos particle entrainment in air. Note in this regard, from FIGS. 1 and 2, that the ends of the conduits are fully enclosed as by the sleeves at 12a and 12b, to completely confine the ends of the asbestos layers. The conduit diameter may be about 7 to 8 inches, for example.

Chip board layer 21 may typically consist of gypsum particles bonded by a silicate bonding material, as referred to.

I claim:

1. A laminated, stiff conduit construction comprising a. a first and innermost layer consisting of metallic foil,
   b. a second layer consisting of fire-proof paper adherent to the first layer at the outer side thereof,
   c. a third layer consisting of fire-proof paper adherent to the second layer at the outer side thereof,
   d. a fourth layer consisting of fire-proof paper forming multiple corrugations whose crests at the inner side of the fourth layer are adherent to the outer side of the third layer,
   e. a fifth layer consisting of fire-proof paper adherent to the crests of the corrugations at the outer side of the fourth layer,
   f. a sixth layer consisting of chip board adherent to the fifth layer at the outer side thereof, the thickness of the sixth layer substantially exceeding the thickness of each of the second, third and fifth layers, but being less than the overall thickness of fourth layer,
   g. and a pre-formed seventh layer including an outwardly facing and exposed metallic foil sheet operatively connected to said sixth layer at the outer side thereof, said seventh layer also including a layer of paper at the inner side of the foil sheet, and glass fiber scrim sandwiched between said last mentioned paper layer and said foil sheet,
   h. said second through fifth layers consisting essentially of Kraft paper and asbestos, the asbestos content substantially exceeding the Kraft paper content, and
   i. said layers being bonded together.

2. The conduit construction of claim 1 wherein each of said layers extends in a spiral along the conduit length and about an axis defined by the conduit, the spirals of successive layers overlapping the joints of next adjacent layers.

3. A conduit system comprising multiple conduits as defined in claim 2, and annular metallic joints interconnecting the conduits in end-to-end series relation, said joints extending in adjacent overlapping relation to both inner and outer metallic layers, said conduits each having a length between about 5 and 9 feet.

4. The conduit system of claim 3 including metallic elbows connected to the ends of certain conduits.

* * * * *